(12) United States Patent
Nilsson et al.

(10) Patent No.: US 6,252,335 B1
(45) Date of Patent: Jun. 26, 2001

(54) BEAM-TYPE ACCELEROMETER

(75) Inventors: Kenth Nilsson; Eva Nilsson, both of Åkersberga (SE)

(73) Assignee: Pacesetter AB, Järfälla (SE)

( * ) Notice: Subject to any disclaimer, the term of this patent is extended or adjusted under 35 U.S.C. 154(b) by 0 days.

(21) Appl. No.: 09/423,382
(22) PCT Filed: May 4, 1998
(86) PCT No.: PCT/SE98/00817
   § 371 Date: Nov. 5, 1999
   § 102(e) Date: Nov. 5, 1999
(87) PCT Pub. No.: WO98/50795
   PCT Pub. Date: Nov. 12, 1998

(30) Foreign Application Priority Data

May 7, 1997 (SE) .................................................. 9701721

(51) Int. Cl.⁷ .................................................. H01L 41/08
(52) U.S. Cl. .................................................. 310/328
(58) Field of Search .................................................. 310/328, 348

(56) References Cited

U.S. PATENT DOCUMENTS 5,425,750   6/1995   Moberg ................................. 607/19
5,614,673 * 3/1997   Yamamoto ........................... 73/514.33

FOREIGN PATENT DOCUMENTS

| 37 03 946 A1 | * 8/1988 | (DE) | ................................. 310/328 |
| 0 355 289 | 2/1990 | (EP) | ........................... G01P/15/09 |
| 2 175 090 | 11/1986 | (GB) | ........................... G01P/15/09 |
| 2 224 599 | 5/1990 | (GB) | ............................. H01L/41/08 |
| 62-108161 | * 5/1987 | (JP) | ................................. 310/328 |
| 1-301177 | * 12/1989 | (JP) | ................................. 310/328 |
| WO 89/00294 | 1/1989 | (WO) | ........................... G01P/15/09 |

* cited by examiner

Primary Examiner—Thomas M. Dougherty
(74) Attorney, Agent, or Firm—Schiff Hardin & Waite

(57) ABSTRACT

An accelerometer has a cantilevered beam supported at one end and having an opposite free end, with an inertial, sensing mass mounted at the free end of the beam. The beam is formed of a piezoelectric layer and a supporting layer. The ratio of the thickness of the piezoelectric layer relative to the thickness of the supporting layer is in a range between 2 and 4. The ratio of the modulus of elasticity of the material forming the supporting layer relative to the modulus of elasticity of the material forming the piezoelectric layer is in a range between 8 and 12.

17 Claims, 2 Drawing Sheets

BEAM-TYPE ACCELEROMETER

BACKGROUND OF THE INVENTION

1. Field of the Invention

The present invention relates to a sensor or accelerometer of the type having a cantilevered beam with a free end at which an inertial mass is mounted, the beam having a piezoelectric layer and a supporting layer and the inertial mass being located eccentrically relative to the longitudinal direction of the beam.

2. Description of the Prior Art

PCT Application WO 89/00294 discloses a conventional beam type accelerometer of the above kind which comprises two layers, a supporting layer made of silicon and a piezoelectric layer bonded to said layer. This accelerometer is intended to be suitable for mass manufacture from silicon wafers and is also intended to be sensitive in a single plane only relative to its mounting. The accelerometer also is intended to have improved sensitivity.

Although this known accelerometer is relatively easy to manufacture, it is sensitive in a plane and it is relatively large, the preferred embodiment having an overall length of about 4 mm.

U.S. Pat. No. 5,425,750 discloses another accelerometer comprising a layered beam. The beam comprises a electrically conducting substrate such as beryllium copper which on each side is covered with a transducing layer of a piezoelectric polymer. The accelerometer is provided with an additional sensing mass in the free end of the beam which is offset in relation to the longitudinal direction of the beam in order to ensure that the accelerometer is sensitive in all directions in a plane.

This known accelerometer thus also is sensitive in several directions, particularly in a direction which is oriented along the longitudinal extent of the beam, i. e. in a direction which is oriented orthogonally to the main direction of sensitivity. The device further is relatively large (a length of about 4 mm in the preferred embodiment) and is comparatively complicated to manufacture.

In many applications, such as for instance so-called rate responsive pacemakers, i. e. pacemakers sensing the physical activity of the patient in order to increase or decrease the stimulation rate applied to the heart in dependence on said activity, there is a need of an accelerometer which is easy and inexpensive to manufacture, which, if so is desired, may have one main sensor sensitivity axis and a negligible cross sensitivity, i. e. a sensitivity which is negligible in directions orthogonal to said main sensitivity axis, which is made small, which is designed to be very sensitive and which may be designed to be highly resistant to shocks.

SUMMARY OF THE INVENTION

It is an object of the present invention to provide an accelerometer which meets the aforementioned unsolved needs and which is particularly suited for use in a rate responsive pacemaker.

The above object is achieved in accordance with the principles of the present invention in an accelerometer having a cantilevered beam with a free end, the beam being formed of at least one piezoelectric layer and at least one supporting layer, with an inertial, sensing mass mounted at the free end of the beam, and wherein the ratio of the thickness of the piezoelectric layer relative to the thickness of the supporting layer is in a range between 2 and 4, and wherein the ratio of the modulus of elasticity of the material of the supporting layer relative to the modulus of elasticity of the material of the piezoelectric layer is in a range between 8 and 12.

DESCRIPTION OF THE PREFERRED EMBODIMENTS

Figure 1:
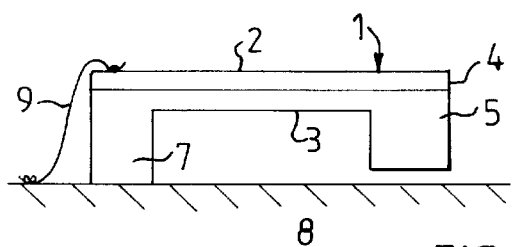
FIG. 1 illustrates a preferred embodiment of the invention.
Figure 2:
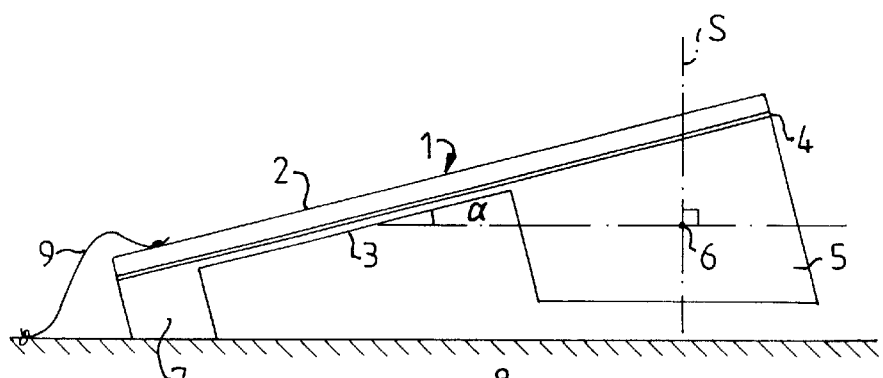
FIG. 2 illustrates a second preferred embodiment of the invention.

FIGS. 1 and 2 illustrate side views of two preferred embodiments of the invention.

A beam 1 comprises a piezoelectric layer 2, which for instance may be made of PZT, and a supporting layer 3. The supporting layer 3 preferably should be of an electrically conducting material. The material in the supporting layer 3 should have a high density. A suitable material is binderless tungsten carbide. The two layers are joined together by means of a layer 4 of an electrically conducting glue. The supporting layer 3 at the free end of the beam 1 is enlarged to form a sensing mass 5 which thus is made in one piece with the supporting layer 3. The sensing mass 5 has a center of gravity 6.

Tungsten carbide is a particularly suitable material since it has a high density, is very strong and has a very high modulus of elasticity as well as being electrically conducting.

The high density of the material in the supporting layer 3 results in that the mass of the sensing mass will be large.

The supporting layer 3 at the opposite end of the beam 1 is also enlarged to form a support 7 which thus also is made in one piece with the supporting layer. The support is glued on to the substrate layer 8, which for instance could be a printed circuit board or a thick film substrate. The beam 1 thus will be cantilevered from this support.

The free upper side of the piezoelectric layer 2 is coated with a thin metallic layer serving as an electrode. A lead or band wire 9 connects this electrode with the substrate. Since the supporting layer 3 is electrically conductive, the layer 3 will, in conjunction with the layer 4 of electrically conductive glue, serve as electrode and conductor for the inner side of the piezoelectric layer.

FIG. 2 illustrates another embodiment of the invention. In this embodiment the accelerometer has a primary direction of sensitivity and a secondary direction of sensitivity S which is oriented orthogonally to the primary direction of sensitivity. The sensitivity in this secondary direction, i. e. the output from the accelerometer in this direction, should be negligible and to this end the beam 1 is oriented in in such a way that a force through the center of gravity of the sensing mass 5 forms an angle a with the longitudinal direction of the beam. Like reference signs in the two embodiments according to FIGS. 1 and 2 denote like features.

Figure 3:
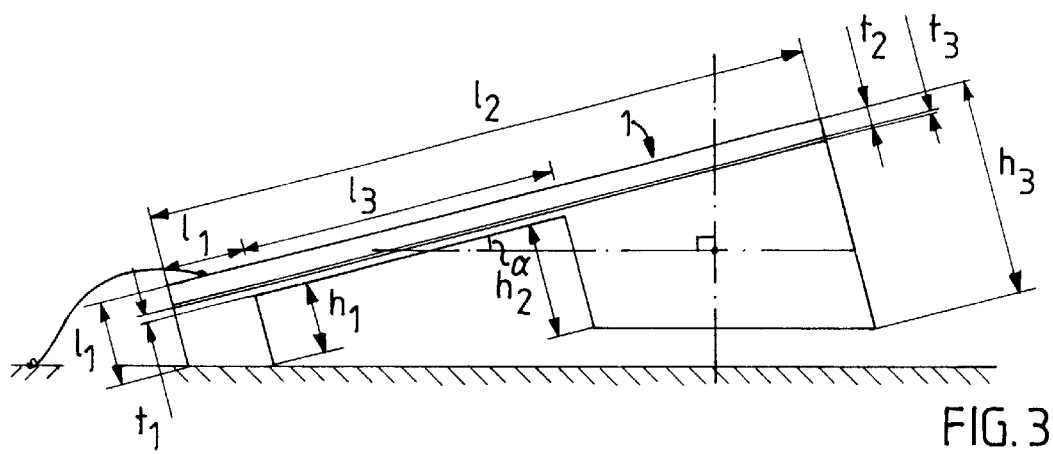
FIG. 3 illustrates the size of the accelerometer in FIG. 2.
Figure 5:
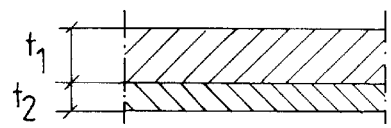
FIG. 5 is a detail of the beam in FIG. 4.

FIG. 3 illustrates the size of a preferred embodiment of the device shown in FIG. 2. In this embodiment the two distances $l_1$ defining the size of the support 7 are 290 μm, the height $h_1$ of the support is 259 μm, the overall length $l_2$ of the beam 1 including support and sensing mass 5 is 2434 μm (≈2.4 mm), and the two heights $h_2$ and $h_3$ defining the size of the sensing mass 5 are 472 respectively 815 μm. The free, deformable length $l_3$ of the beam 1 is 1160 μm, the thickness $t_1$ of the supporting 3 layer is 22 μm, the thickness $t_3$ of the layer bonding the supporting layer 3 and the piezoelectric layer 2 is 10 μm and the thickness $t_2$ of the piezoelectric layer 2 will be 65 μm. The angle α is 14 degrees. The maximal height of the accelerometer over the substrate is 866 μm. The deflection of the free end of the beam 1 under the influence of a force along the primary direction of sensitivity S is in the size order of one nanometer.

The device according to the invention thus may be designed to be much smaller than the prior art devices described above.

The width of the accelerometer may for instance be 760 μm. This width will be sufficient to ensure that the accelerometer is insensitive in directions orthogonal to the plane of the drawing. Apart from the desired rigidity in the direction orthogonal to the plane of the drawing, there are no restrictions on the width.

As indicated above, the supporting layer 3 is made of a material with a very high strength and may thus be made thin in comparison to the piezoelectric layer 2. The supporting layers 3 has a modulus of elasticity which is very high, so that the supporting layer will guide the deflection of the beam 1 in such a way that the neutral layer of the beam 1 will be located close to the boundary between supporting layer 3 and piezoelectric layer or even in the supporting layer. This will ensure that the piezoelectric layer will be deformed in such a way that a very high sensitivity is obtained.

The ratio of the respective moduli of elasticity for the supporting layer 3 and the piezoelectric layer 2 should be in the range between 8–12, preferably about 10.

The material in the supporting layer 3 in a preferred embodiment should have a modulus of elasticity $\geq$ 400 GPa, preferably $\geq$ 500 GPa whereas the material in the piezoelectric layer 2 should have a modulus of elasticity $\geq$ 40 GPa, preferably $\geq$ 50 GPa, more preferably $\geq$ 70 GPa. The tungsten carbide used in the preferred embodiment has an modulus of elasticity of about 670 GPa whereas the modulus of elasticity for PZT is about 67 GPa. Both these materials are ceramic materials and are well matched in regard of their thermal expansion coefficients.

A suitable range for the ratio R between the thicknesses of the supporting layer 3 and the piezoelectric layer 2 in this case may be between 2 and 5, in the preferred embodiment 3.

The presence of the angle α as defined above has the effect that the sum of the deformations along the beam 1 under the influence of a force which is orthogonal to the primary direction of sensitivity S is negligible, i. e. that the output from the piezoelectric layer 2 as a result of this force will be negligible and that the accelerometer consequently will be insensitive in this direction.

In the preferred embodiments of the invention, for instance according to FIGS. 1 and 2, α may be in the range $5° \leq \alpha \leq 30°$, suitably in the range $10° \leq \alpha \leq 16°$ and preferably within the range $13.5° \leq \alpha \leq 14.5°$.

Figure 4:
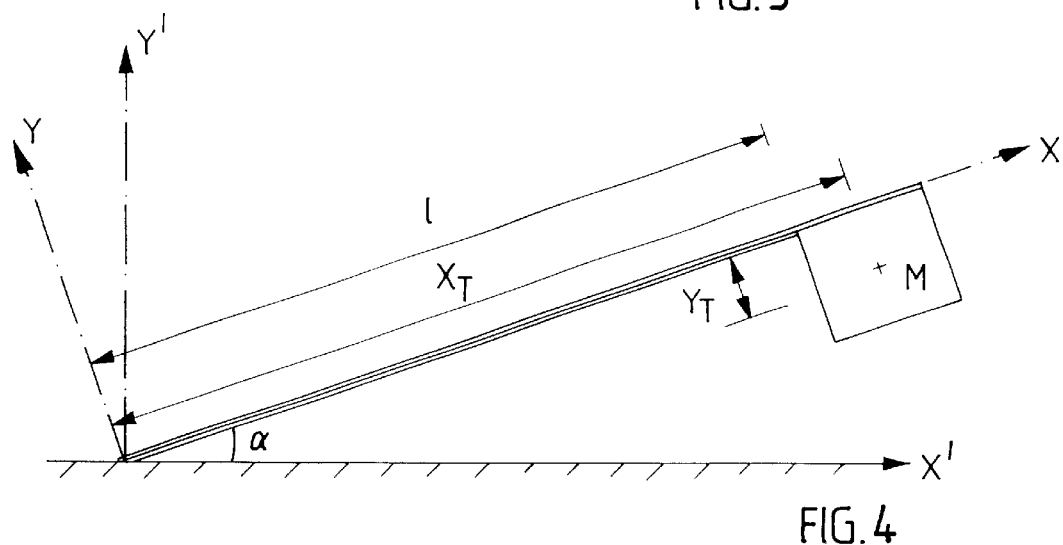
FIG. 4 illustrates a simplified, schematic embodiment of the invention.

The angle α is to some extent dependent on the geometry of beam 1 and sensing mass 5. An idea of this functional relationship may be obtained by means of the idealized and simplified model of the accelerometer shown in FIGS. 3 and 4.

In this model $X_T$ and $Y_T$ are the coordinates for the center of gravity of the sensing mass 5 in the X-Y-system, $E_1$ is the modulus of elasticity of the piezoelectric layer 2, $E_2$ is the modulus of elasticity of the supporting layer 3, $t_1$ is the thickness of the piezoelectric layer 2, $t_2$ is the thickness of the supporting layer 3, l is the deformable length of the beam 1, $F \approx \alpha$ Y' the primary direction of sensitivity S, and X' the orthogonal direction with negligible sensitivity, M is the center of gravity of the sensing mass 5.

The weight of the beam 1 is considered negligible in comparison with the weight of the sensing mass 5.

Under these circumstances the following functional relationship can be found, the requirement being that the mean value of the positive stress in the piezoelectric layer 2 is compensated by the mean value of the negative stress in the layers which are caused by a force directed along the X'-axis.

$$F = \arctan\left\{\frac{E_1^2 t_1^2 (4t_1^2 - 6t_1 t_2 + 3t_2^2) - E_1 E_2 t_1 t_2 [6Y_T(t_1 + t_2) - t_1^2 - 13t_2^2] + E_2^2 t_2^2 [t_2^2 - 6Y_T(t_1 + t_2)]}{3E_2 t_2 (E_1 t_1 + E_2 t_2)(2X_T - l)(t_1 + t_2)}\right\}$$

Under these conditions, F is a fairly good approximation of α. A comparison with the above detailed embodiment described in conjunction with FIGS. 1 and 2 indicates that another way of expressing the variation of α would be $0.7F \leq \alpha \leq 12F$.

Figure 6:
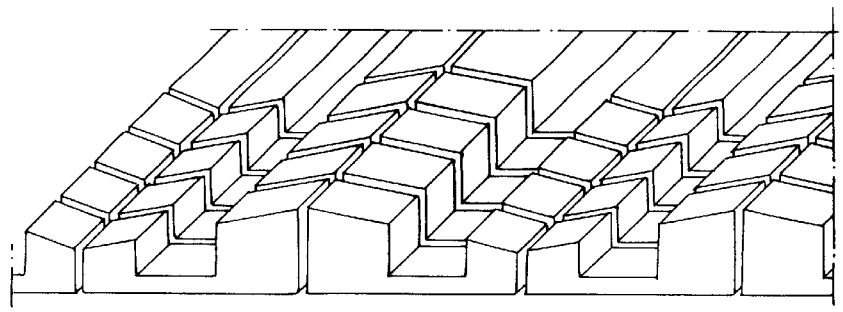
FIG. 6 illustrates a way of manufacturing an accelerometer according to the invention.

As illustrated in FIG. 6, the device according to FIGS. 2 and 3 can be manufactured from a bilaminar wafer comprising the supporting layer 3 and the piezoelectric layer 2. The wafer may for instance be placed on the vacuum chuck of a so called dice cutter. The dice cutter is programmed to structure the electrically conductive material so that the support, the deflectable part of the beam 1 and the sensing mass 5 are formed. The dice cutter is then used to cut the structured wafer into a large number of individual accelerometers. The device according to FIG. 1 of course also may be manufactured in this way.

By means of the invention an accelerometer is obtained which can be designed to be very small but in spite of this highly sensitive, which may have a primary direction of sensitivity S and which if desired may have a negligible cross-sensitivity and which can be designed to be extremely shock-resistant. The accelerometer may have a generally linear response up to accelerations of 100 G and may be designed to withstand shocks up to 1200G.

Although modifications and changes may be suggested by those skilled in the art, it is the intention of the inventors to embody within the patent warranted hereon all changes and modifications as reasonably and properly come within the scope of their contribution to the art.

What is claimed is:

1. An accelerometer comprising:

a cantilevered beam having a fixed end and a free end;

said cantilevered beam being composed of at least one piezoelectric layer and at least one supporting layer;

an inertial mass mounted at said free end of said cantilevered beam;

said piezoelectric layer having a modulus of elasticity $E_1$ and a thickness $t_1$, and said supporting layer having a modulus of elasticity $E_2$ and a thickness $t_2$; and a ratio of the thickness $t_1$ relative to the thickness $t_2$ being in a range between 2 and 4, and a ratio of said modulus of elasticity $E_2$ relative to said modulus of elasticity $E_1$ being in a range between 8 and 12.

2. An accelerometer as claimed in claim 1 wherein said ratio of said thickness $t_1$ relative to said thickness $t_2$ is 3.

3. An accelerometer as claimed in claim 1 wherein said ratio of said modulus of elasticity $E_2$ relative to said modulus of elasticity $E_1$ is 10.

4. An accelerometer as claimed in claim 1 wherein said modulus of elasticity $E_2 \geq 400$ GPa.

5. An accelerometer as claimed in claim 1 wherein said modulus of elasticity $E_2$ is $\geq 2500$ GPa.

6. An accelerometer as claimed in claim 1 wherein said supporting layer is comprised of electrically conducting material.

7. An accelerometer as claimed in claim 1 wherein said beam has a longitudinal direction proceeding between said fixed end and said free end, and wherein said inertial, sensing mass is mounted at said free end eccentrically relative to said longitudinal direction of said beam.

8. An accelerometer as claimed in claim 1 wherein said supporting layer is comprised of tungsten carbide.

9. An accelerometer as claimed in claim 1 wherein said supporting layer is comprised of binderless tungsten carbide.

10. An accelerometer as claimed in claim 1 wherein said supporting layer and said inertial mass are integrally formed of the same material.

11. An accelerometer as claimed in claim 1 wherein said piezoelectric layer is comprised of PZT.

12. An accelerometers as claimed in claim 1 wherein said beam has a longitudinal direction proceeding between said fixed end and said free end and wherein said cantilevered beam and said sensing mass, in combination, have a primary direction of sensitivity to acceleration forces, and a secondary direction of sensitivity to acceleration forces which is orthogonal to said primary direction and in which sensitivity to acceleration forces is negligible, said secondary direction forming an angle $\alpha$ relative to said longitudinal direction so that a line coinciding with a force proceeding through a center of gravity of said inertial mass, and which is directed in said secondary direction, also intersects said beam.

13. An accelerometer as claimed in claim 12 wherein said center of gravity of said inertial mass is M and has coordinates $X_T$ and $Y_T$ in an X-Y coordinate system, wherein said piezoelectric layer has a modulus of elasticity of $E_1$ and a thickness $t_1$, wherein said supporting layer has a modulus of elasticity $E_2$ and a thickness $t_2$, and wherein said beam has as deformable length l, wherein Y' represents said primary direction of sensitivity and wherein X' represents said secondary direction of sensitivity, and wherein $0.7\ F \leq \alpha \leq 1.2\ F$, wherein $$F = \arctan\left\{\frac{E_1^2 t_1^2(4t_1^2 - 6t_1t_2 + 3t_2^2) - E_1E_2t_1t_2[6Y_T(t_1 + t_2) - t_1^2 - 13t_2^2] + E_2^2t_2^2[t_2^2 - 6Y_T(t_1 + t_2)]}{3E_2t_2(E_1t_1 + E_2t_2)(2X_T - l)(t_1 + t_2)}\right\}.$$

14. An accelerometer as claimed in claim 12 wherein $5° \leq \alpha \leq 30°$.

15. An accelerometer as claimed in claim 12 wherein $10° \leq \alpha \leq 16°$.

16. An accelerometer as claimed in claim 12 wherein $13.5° \leq \alpha \leq 14.5°$.

17. An accelerometer as claimed in claim 12 wherein $\alpha = 14°$.

* * * * *